3,008,876
COMPOSITIONS CONTAINING GRISEOFULVIN
Alan Rhodes, Bracknell, and Kenneth Arthur Lees, Salt Hill, Slough, England, assignors to Glaxo Laboratories Limited, Greenford, England, a British company
No Drawing. Filed June 19, 1956, Ser. No. 592,270
Claims priority, application Great Britain June 25, 1955
8 Claims. (Cl. 167—65)

This invention is concerned with improvements in or relating to compositions containing griseofulvin, and in particular with such compositions adapted for use in agriculture.

Griseofulvin is an antibiotic which has antifungal properties, particularly against various fungi which attack plants; for example apple scab (Venturia), grey mould of lettuce etc. (Botrytis), die-back of carnations (Fusarium) tulip fire (*Botrytis tulipae*), Chrysanthemum mildew (*Oidium chrysanthemi*) blotch of cucumber (Cercospora) and early blight of tomato (Alternaria) are controlled by griseofulvin.

Virtually no commercial use has hitherto been made of griseofulvin, due in part to the difficulty of formulating it satisfactorily for agricultural uses. This difficulty arises principally from its very low solubility in water (approximately 30–70 mg./litre) and other common solvents. Thus, for example, at normal temperatures of 15–20° C., griseofulvin is soluble in the following solvents to an extent of only about 1% w./v. or less: methylethyl ketone, diethyl ketone, diacetone alcohol, acetophenone, benzophenone and methyl isobutyl ketone. Solubilities of this order are not sufficient to enable solutions of griseofulvin of satisfactory concentration to be made which will allow of convenient agricultural use.

Furthermore, it is clear that any solvent used for griseofulvin must be substantially non-toxic in the application for which it is intended. Thus, for example, when used in agriculture this solvent must not be substantially phytotoxic, i.e. must not adversely affect the growth of the plant being treated, at the levels of concentration at which it will be applied. It is also naturally essential that any solvent used should be substantially inert towards griseofulvin.

We have made extensive investigations in an effort to find suitable solvents for griseofulvin which fulfil these various criteria. For the reasons already given, both water and a wide variety of common organic solvents have been rejected, either due to their low dissolving power for the antibiotic, or because of their toxicity in the applications envisaged for their use.

We have, however, now found certain solvents which do possess the power to dissolve griseofulvin to a satisfactory degree, which are substantially nonphytotoxic for a wide range of plants at the levels of application envisaged from them, which are inert to griseofulvin, and which are in a reasonable degree readily available and sufficiently inexpensive at the present time to make their use feasible on a commercial scale.

These solvents for griseofulvin within the scope of the present invention are water miscible N-alkyl-amides of aliphatic acids. Within this class, N,N-dimethyl formamide and N,N-dimethyl acetamide are the preferred compounds on account of their balance of properties, including cost.

According to the invention therefore there is provided a composition containing griseofulvin and adapted to be used in agriculture, which comprises griseofulvin dissolved in a solvent selected from the class consisting of water-miscible N-alkyl-amides of aliphatic acids.

The preferred compositions according to the present invention comprise griseofulvin dissolved in dimethyl formamide and/or dimethyl acetamide.

We have found that for most purposes satisfactory commercial formulations of griseofulvin should contain at least 2.5% w./v. of griseofulvin, and desirably about 5% or higher. It should of course be remembered that the maximum solubility of griseofulvin in any given solvent will vary in relation to the temperature so that stable solutions must be made up to a concentration not exceeding the maximum solubility of griseofulvin in the particular solvent at the temperatures which are likely to be encountered in use, as will be more fully explained hereinafter.

The main use at the present time of griseofulvin is as a fungicide for use in the control of plant fungal diseases. For this purpose it may be applied as a suspension or emulsion in water as a spray. Compositions according to the invention are in principle suitable for use as concentrates for the preparation of such sprays. For this particular purpose however, the compositions should preferably include one or more surface-active agents, since these surface-active agents desirably fulfil the functions of not only dispersing the griseofulvin upon its addition to water, but also acting as a wetting-agent to ensure thorough wetting of the surface to which the composition is applied in use. These surface-active agents should be such as will be completely miscible with the concentrated solution of griseofulvin, and are preferably of the non-ionic hydrophilic kind, examples of which are sorbitan or fatty alcohol ethers or the fatty acid esters of polyethylene glycol.

The choice of surface active agent will with advantage depend on the solvent employed. Thus, with dimethyl formamide or dimethyl acetamide solutions we prefer to use a wetting-agent such as those sold under the names Empilan AQ–100 and Tween 20.

The compositions according to the invention may also include other components, such for example as sticking-agents provided that such components are compatible with the composition. One convenient type of sticking-agent which has been found to be compatible with these compositions are synthetic resins of the coumarone indene type; but other kinds will readily suggest themselves to those skilled in the art.

The compositions of griseofulvin provided according to the present invention markedly facilitate the agricultural pplication of griseofulvin. Thus, where it is desired to formulate a fungicide in a form suitable for agricultural spraying purposes, the active material can conveniently be provided in a concentrated form that can be diluted to spray strength by the farmer or other user. Accordingly for convenience in marketing, concentrated solutions of the antibiotic are required which, before use can be conveniently mixed with for example water by the user to the necessary concentration for application. Prior to the present invention it was not possible, so far as is known, to obtain a concentrated solution of griseofulvin suitable for this purpose, and accordingly the present invention provides a considerable advance in the technique of the use of griseofulvin.

In evaluating the utility of any given liquid as a solvent for griseofulvin we have usually found it desirable to regard stability of the solution at 0° C. as one of the criteria, since freezing temperatures of this order are frequently liable to be encountered during winter in merchants' stores or even shops. The solubility of griseofulvin in the solvent chosen according to the invention is in general satisfactory at temperature of the order of 0° C. Thus, tests conducted by subjecting samples of solutions of griseofulvin to temperatures of 0°±1° C. for periods of at least 24 hours show that dimethyl formamide has an approximate maximum solubility at this temperature of 5% w./v.

A still further advantage possessed by compositions of griseofulvin according to the present invention is that, especially where they incorporate an emulsifying agent, solutions of griseofulvin in the solvents herein disclosed on dilution with water precipitate a fine stable emulsion or suspension of griseofulvin, which is sufficiently stable for spraying with normal agricultural spray equipment.

Solutions of griseofulvin according to the present invention may also conveniently be used as the basis for the preparation of aerosol formulations. In such cases, a concentrated solution is usually required. By reason of the comparatively high boiling point and hence low volatility of the solvents used according to the invention the composition will usually be atomised by a spray gun, though if highly volatile ingredients are added to the composition such aerosols may be produced by first compressing the mixture and then releasing the pressure. The low volatility of the solvents used according to this invention however leads to some degree of phytotoxicity when the concentrated solutions are applied in atomized form, and accordingly such aerosol formulations should be applied with care for agricultural purposes.

It is also possible to use solutions of griseofulvin according to the present invention as impregnating solutions, for example for timber, or in the impregnation of fruit wrapping papers. In such cases, it is preferable to use a true solution of the antibiotic, rather than an emulsion.

Examples of solutions of griseofulvin for agricultural purposes will now be given by way of illustration only:

EXAMPLE 1

6 g. griseofulvin is dissolved in 66 mls. N,N-dimethylformamide to give a 9% solution. 6.81 ml. of a suitable wetting agent, for example Empilan AQ-100 (a monolaurate ester of polyethylene glycol manufactured by Marchon Products Ltd., Whitehaven, Cumberland), is added resulting in a clear, completely miscible liquid concentrate that can be stored for long periods without loss of griseofulvin potency or the onset of other deleterious effects.

When required for use, the liquid concentrate is poured into the required volume of water and griseofulvin is immediately precipitated as a fine suspension, the particles of which are dispersed by the wetting agent. It is convenient to dilute the pack mentioned above with 3 gals. of water when the diluted spray contains 440 µg. griseofulvin/ml. Other spray concentrations can be prepared by making the appropriate dilution.

Such a spray has been shown to be free from phytotoxicity on a wide range of crops, for example peaches, apples, gooseberries, tulips, lettuce, broad beans, roses.

EXAMPLE 2

To prepare a griseofulvin liquid concentrate for atomisation, griseofulvin is simply dissolved in N,N-dimethylformamide to give a solution of convenient concentration. Solutions having a concentration of from 4.5 to 9% are suitable for treatment of many crops.

EXAMPLE 3

For impregnation with griseofulvin, the material to be treated, for example paper, is soaked in a solution of griseofulvin in N,N-dimethylformamide of the required potency. After treatment the solvent is evaporated off at low temperature in vacuo.

EXAMPLE 4

6 g. griseofulvin is dissolved in 66 ml. of N,N-dimethylacetamide to give a 9% solution. 6.81 ml. of a suitable wetting agent, for example Empilan AQ-100, is added resulting in a clear, completely miscible liquid concentrate. When required for use, the liquid concentrate is poured into the required volume of water and griseofulvin is immediately precipitated as a fine suspension, the particles of which are dispersed by the wetting agent. It is convenient to dilute the solution mentioned above with 3 gallons of water, when the diluted spray contains 440 mcg. griseofulvin/ml. Other spray dilutions can be prepared by making the appropriate additions of water.

EXAMPLE 5

Control of chrysanthemum mildew (Oidium chrysanthemi)

125 chrysanthemum plants of the mildew susceptible variety "Meteore" were treated with 0.044% griseofulvin in dimethylformamide spray, prepared by diluting the following solution:

| | |
|---|---|
| Griseofulvin _____gm__ | 6 |
| Empilan AQ-100_____ml__ | 6.8 |
| Dimethylformamide _____ml__ | 66 | with water to 3 gallons. This amount was used to spray the plants. Another 120 plants were untreated and used as "controls." All the plants were 6–9 inches high at this stage.

At the end of the following month the beneficial effect of the spray was apparent, untreated plants having lost more of their lower leaves as a result of mildew infection than had the treated plants. The mean distance from the pot to the lowest green leaf on the treated plants was 3.8 inches as against 5.4 inches on the controls. The plants were given another spray prepared as above, using 6 gallons of spray.

In the third month the average distance of the lowest green leaf from the pot was 3.1 inches in the treated plants as against 18.8 inches in the controls. Examination of ten plants from each group showed that only 3.5% of the leaf area of the treated plants was covered with mildew whereas 42.5% of the leaf area of the leaves of the untreated plants was covered. The plants were given a third spray of six gallons, prepared as described above. At about this time the controls had to be treated with a fungicide to prevent them becoming a total loss.

The experimental plants were sprayed again in the fifth month soon after being transferred to a glasshouse. At this time only 9.5% of the leaves were infected with mildew. Similar measurements in the sixth month showed only 10.4% of the leaves to be infected. Finally, a harvest count showed a higher percentage of good quality blooms was obtained from the griseofulvin treated plants than was obtained from the controls.

EXAMPLE 6

Control of tulip fire (Botrytis tulipae)

Two plots of tulips were sprayed five times with griseofulvin solution in dimethylformamide, one with a 0.044% solution prepared as in Example 5, the other with a 0.088% solution prepared by using half as much water. The third plot was left untreated as a control. Between the third and fourth applications the plants were infected by spraying with a suspension of Botrytis tulipae. Subsequently the leaves and blooms were examined for infection with the following results:

| | Leaves, percent infection | Blooms, percent infection |
|---|---|---|
| 0.044% spray | 19 | 29 |
| 0.088% spray | 11 | 16 |
| Controls | 39 | 58 |

Thus it can be seen that sprays of griseofulvin prepaired from dimethylformamide solution give substantial control against "tulip fire" infection.

We claim:

1. A composition comprising griseofulvin dissolved in a solvent selected from the group consisting of N,N-dimethyl formamide and N,N-dimethyl acetamide water-miscible N-alkyl amide of an aliphatic acid.

2. A composition according to claim 1, containing at least 2.5% w./v. of grisofulvin.

3. A composition according to claim 1, wherein the solvent is N,N-dimethyl formamide.

4. A composition according to claim 3, containing at least approximately 5% w./v. of griseofulvin.

5. A composition according to claim 1, wherein the solvent is N,N-dimethyl acetamide.

6. A composition according to claim 5, containing at least approximately 5% w./v. of griseofulvin.

7. A composition according to claim 1, incorporating up to 10% w./v. of a surface-active agent.

8. A composition according to claim 7, wherein said surface-active agent is of the non-ionic hydrophilic type.

References Cited in the file of this patent

UNITED STATES PATENTS

| | | |
|---|---|---|
| 2,627,491 | Szabo | Feb. 3, 1953 |
| 2,650,218 | McDuffie | Aug. 25, 1953 |
| 2,653,899 | Bunch et al. | Sept. 29, 1953 |
| 2,671,748 | Crooks | Mar. 9, 1954 |
| 2,900,304 | Martin | Aug. 18, 1959 |

OTHER REFERENCES

Brian et al.: Nature, Mar. 3, 1951, 347–349.

Davis et al.: Phytopathology, July 1951, vol. 41, No. 7, page 657.

Jones et al.: Soap and Sanitary Chemicals, pages 100, 1945.

McClelland et al.: Chemical and Engineering News, vol. 23, No. 3, Feb. 10, 1945, pp. 247–248.

Husa: "Pharmaceutical Dispensing," 3rd ed. (1947), pp. 391–394, esp. page 391, under "Classes of Incompatibilities," 1st, 2nd and 6th paragraphs; p. 392 under "Physical Incompatibilities"; p. 393 (B) and p. 394 (D).

Ashton et al.: Chemistry and Industry, No. 38, Sept. 17, 1955, page 1183.

"Griseofulvin," British Medical Journal, Nov. 28, 1959, No. 5160, page 1165.

Oxford et al.: Biochem. J., vol. 33, page 240 (1939).

Brian et al.: Trans. Brit. Mycol. Soc., vol. 29, pp. 173–189 (1946).

Grove et al.: J. Chem. Soc., 1952, p. 3977.

UNITED STATES PATENT OFFICE
CERTIFICATE OF CORRECTION

Patent No. 3,008,876                                November 14, 1961

Alan Rhodes et al.

It is hereby certified that error appears in the above numbered patent requiring correction and that the said Letters Patent should read as corrected below.

Column 2, line 45, for "pplication" read -- application --; column 4, lines 72 and 73, strike out "water-miscible N-alkyl amide of an alphatic acid".

Signed and sealed this 17th day of April 1962.

(SEAL)
Attest:
ESTON G. JOHNSON
Attesting Officer

DAVID L. LADD
Commissioner of Patents